United States Patent Office 2,724,894
Patented Nov. 29, 1955

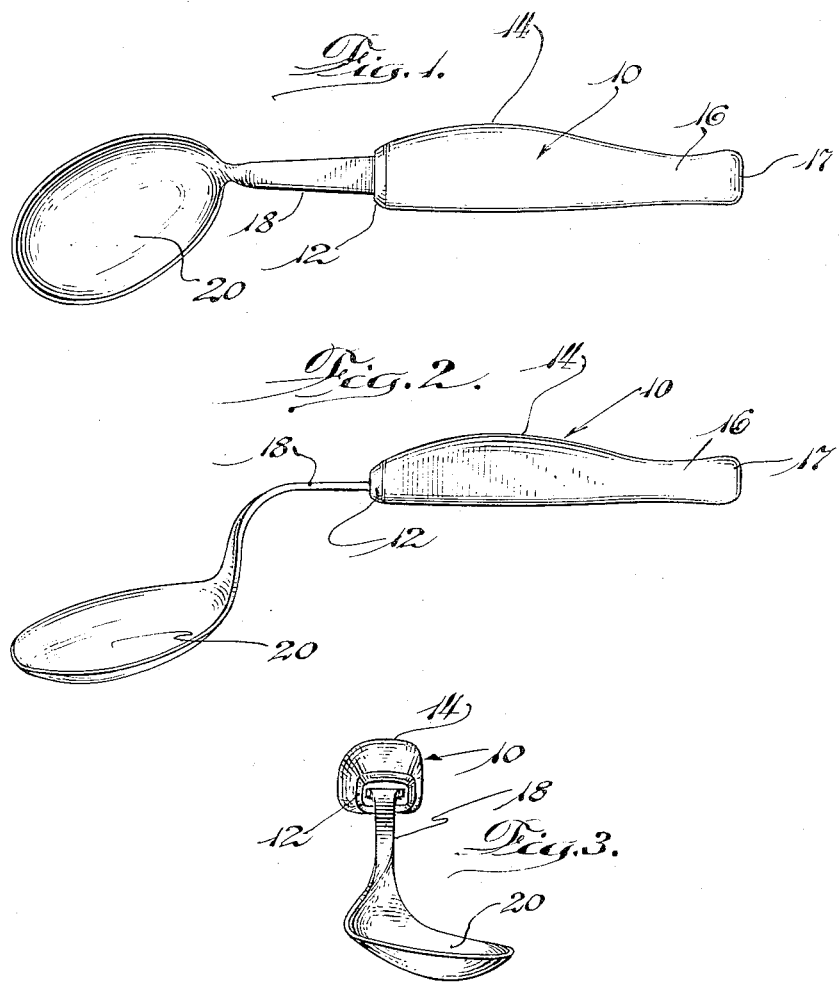

2,724,894

INFANT'S SELF-FEEDING SPOON

Clifford S. La Tour, Milwaukee, Wis., assignor to Lyn-Chicago Corporation, Chicago, Ill., a corporation of Illinois Application April 2, 1952, Serial No. 280,051

1 Claim. (Cl. 30—324)

The present invention relates to infants' spoons. More particularly the invention is concerned with the provision of a spoon which is so contoured as to make its use natural and therefore extremely easy by an infant. Among other advantages this promotes self-feeding by the infant at an earlier age and with less difficulty than is normally encountered. This application is a division of my copending application Serial No. 66,906 filed December 23, 1948, for "Infant's Feeding Set," which has matured into Patent No. 2,596,255, issued May 13, 1952.

The principal object of the present invention is to provide an attractive spoon which is so shaped as to make self-feeding by an infant natural and extremely easy.

Other objects and advantages will become apparent from the following description of a preferred embodiment of my invention which is illustrated in the accompanying drawings.

In the drawings—

Fig. 1 is a top view of a spoon embodying the present invention;

Fig. 2 is a side view thereof; and

Fig. 3 is an end view thereof looking at the bowl end of the spoon.

My investigations have disclosed that an infant at the time he first begins to feed himself finds great difficulty in handling a spoon in the normal adult fashion, but instead grasps the spoon in a crosswise fashion with the palm down and the thumb and fingers beneath the handle so as to hold it in his fist. In order not to interfere with this normal tendency, the handle of my spoon, indicated generally by the numeral 10, is made rather large and full in section and has a substantially flat lower surface, against which the thumb and fingers can obtain a firm grasp, and a well rounded convex upper surface adapted to fit within the palm of the infant's hand in a crosswise manner. As shown, the well rounded convex surface extends along the upper side and one longitudinal side of the handle, merging along its longitudinal edges with a slightly convex surface running along the opposite side of the handle and with a generally flat surface on the underside of the handle. Furthermore, the portion 12 of the handle toward the shank of the spoon is sharply rounded downwardly toward the shank and is of small section where it joins the shank.

Toward the opposite end of the handle the top surface thereof slopes gradually downwardly and the rearward edge thereof also slopes forwardly so as to form a section of comparatively small width and thickness as at 16 which is offset downwardly and forwardly of the center line of the spoon handle. Beyond the constriction 16 the handle enlarges somewhat so as to form a slight knob 17 which helps to prevent the handle from slipping in an endwise direction within the infant's fist All these surfaces are well rounded and blended together. Normally this handle will be grasped in such manner that the edge of the fist toward the little finger will seat within the depression formed by the constricted portion 16 whereas the thumb and forefinger will be placed about the handle slightly ahead of the point of largest thickness at 14. This portion of largest section is about one-third of the length of the handle from the shank end.

The spoon shank 18 includes a handle section extending straight outwardly from the end 12 of the handle for a distance equal to substantially one-third of the length of the handle. From the outer end of this section the shank bends substantially straight downwardly for a distance of approximately three-quarters of an inch or so to form a bowl section that is connected to the spoon bowl 20 which inclines away from the axis of the handle in a direction toward the infant at an angle of approximately 25°.

The bowl 20 of the spoon is therefore offset well downwardly from the center line of the handle and is angled toward the infant. This greatly facilitates use of the spoon, since it permits the infant to dip the bowl of the spoon into the food while keeping his closed fist at an appreciable distance above the level of the food. Also it has been found that when the infant raises the spoon and swings it toward his mouth, the angular offset causes the bowl to enter his mouth in a convenient endwise direction without much conscious effort.

The result of all of these special features is to enable an infant to learn to feed himself with less special effort and frustration and with much less spillage than is ordinarily encountered.

I prefer to manufacture a spoon of this type by forming the bowl and shank portion in one piece from any of the usual metals employed for such purposes and to bend or otherwise shape the metal to the contour shown and described. This spoon blank is then attached to a handle portion preferably formed of a nonheat-softening plastic substance by inserting the end of the spoon blank into a handle mold and molding the handle and intimately attaching it to the shank of the spoon at the same time.

Having described my invention, what I claim as new and useful and desire to secure by Letters Patent of the United States is:

An infant's feeding spoon comprising, in combination, an elongated handle having a generally flat underside, the forward portion of said handle being thickened upwardly and laterally to define a well rounded convex gripping surface extending around the upper side and one longitudinal side of the handle to merge along one longitudinal edge with said generally flat underside, a convex side surface running along the opposite longitudinal side of said handle and having a curvature less than that of said rounded gripping surface, opposite longitudinal edges of said side surface merging with said gripping surface and said underside of the handle, a shank fixed to said handle and including a handle section extending outwardly from the forward end of the handle in generally parallel relation to the flat underside thereof for a substantial distance beyond said handle, said shank being turned sharply downward from the outer end of said handle section thereof to form a bowl section of substantial length, and an elongated bowl connected to the lower end of said bowl section of the shank and disposed at a substantial distance below said handle underside in a laterally turned position extending to the side of the center line of the handle corresponding to said opposite longitudinal side thereof.

References Cited in the file of this patent

UNITED STATES PATENTS

| | | |
|---|---|---|
| D. 146,824 | Goodwin | May 27, 1947 |
| 1,064,206 | Gould | June 10, 1913 |
| 1,625,003 | Walker | Apr. 19, 1927 |
| 1,789,930 | Guth | Jan. 20, 1931 |
| 2,012,637 | Ribley | Aug. 27, 1935 |
| 2,016,861 | Jennings | Oct. 8, 1935 |
| 2,234,242 | Gilbert | Mar. 11, 1941 |